No. 762,306. PATENTED JUNE 14, 1904.
C. J. GRIFFITH.
COMBINED CHURN AND BUTTER WORKER.
APPLICATION FILED JUNE 2, 1903.
NO MODEL.
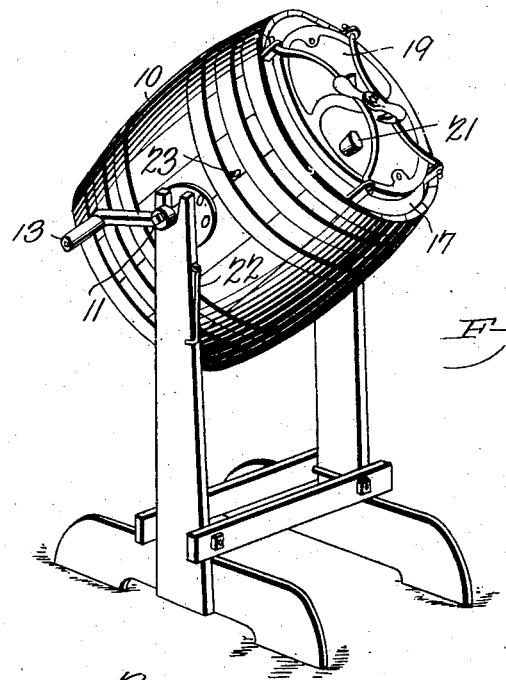
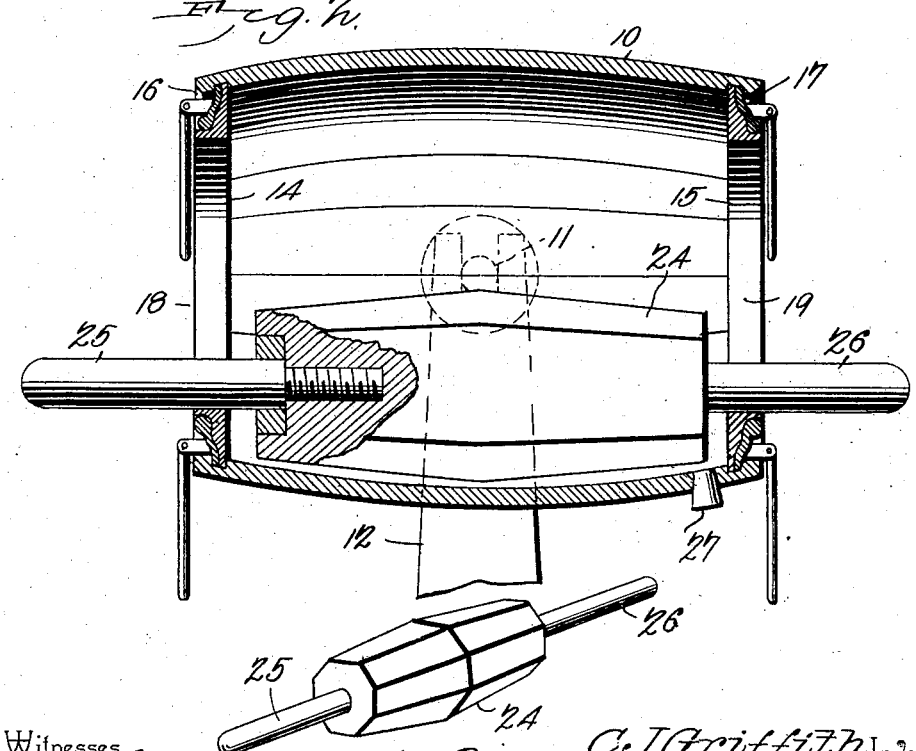

No. 762,306.                                                   Patented June 14, 1904.

UNITED STATES PATENT OFFICE.

CLARENCE J. GRIFFITH, OF FORT COLLINS, COLORADO.

COMBINED CHURN AND BUTTER-WORKER.

SPECIFICATION forming part of Letters Patent No. 762,306, dated June 14, 1904.

Application filed June 2, 1903. Serial No. 159,782. (No model.)

*To all whom it may concern:*

Be it known that I, CLARENCE J. GRIFFITH, a citizen of the United States, residing at Fort Collins, in the county of Larimer and State of Colorado, have invented a new and useful Combined Churn and Butter-Worker, of which the following is a specification.

This invention relates to the art of butter-making, and has for its object to produce a device wherein the butter particles are expeditiously and thoroughly separated and the gathered butter "worked" or manipulated to remove the remaining buttermilk and to impregnate with salt or other substances without removal from the separating-receptacle.

The invention consists in certain novel combinations and arrangements of parts and in certain novel features of the construction, as hereinafter shown and described, and specified in the claims.

In the drawings illustrative of the invention, in which corresponding parts are denoted by like designating characters, Figure 1 is a perspective view of the improved device complete when used as a churn. Fig. 2 is a longitudinal sectional elevation, enlarged, of the device, illustrating its use as a butter-worker. Fig. 3 is a detached detail perspective view, on a reduced scale, of the "worker-roller."

The improved device consists of a receptacle for the cream to be churned, having openings in the opposite ends provided with suitable closures for use during the churning process and which when removed after the butter has been "gathered" and the buttermilk drawn off provides for the insertion and operation of a "working" implement, so that the butter may be churned, washed, and worked in the same receptacle and without removal therefrom until the various steps of the process are completed. The receptacle will preferably be of the "barrel" form, mounted for longitudinal rotation in a suitable frame, but may be of any other desired form, and I do not, therefore, wish to be limited to any specific form of the receptacle and reserve the right to employ any suitable construction operated in any suitable manner. For the purpose of illustration an ordinary barrel form of receptacle is shown at 10, having trunnions 11 at opposite sides to provide for rotatively mounting the receptacle upon a supporting-frame 12 of the usual construction, one of the trunnions having means for the attachment of a crank 13, as shown. The ends of the receptacle 10 are formed of annular members 14 15, having exterior annular supporting members 16 17, as shown in Fig. 2. The receptacle 10 and end members 14 15 will preferably be of wood and the supporting members 16 17 of metal, the inner edges of the members 14 15 having rims 18 19 projecting over the adjacent edges of the members 16 17, so the cream or butter will not come in contact with any of the metal parts. The apertures formed by the members 14 15 will thus be disposed centrally in the opposite ends of the receptacle, as shown, and will be provided, respectively, with wooden-lined closures adapted to be clamped by any suitable means to the rims 18 19 of the members 14 15 to form a cream-tight joint between the closures and receptacles. The receptacle will be provided with draw-off plugs of any approved form, as at 21 27, by which the buttermilk and wash-water may be removed. By this means a complete churn structure is produced in which the butter particles can be thoroughly and expeditiously separated and the buttermilk drawn off through the plug 21. The receptacle 10 is then "anchored" in a horizontal position in the frame 12, as by hooks 22 engaging staples 23, and the end closures removed, which leaves the butter mass exposed from both ends of the receptacle in convenient position to be worked and washed and impregnated with salt or other substances in the usual manner. The worker-roller is represented at 24 and consists of an angular-sided block larger centrally than at the ends and with handles 25 26, extending from opposite ends, as shown, so that a person can manipulate it from opposite ends of the receptacles. The annular members 14 15 thus serve as end stops to prevent the butter from being thrown from the receptacle while being operated on and also to prevent the released buttermilk or wash-water from escaping at the ends of the receptacle.

One or both of the handles 25 26 may be removable from the roller 24, as indicated in Fig. 2, to enable the roller to be more thoroughly cleansed and scalded in the churn at the same time the latter is scalded, thus obviating the necessity for providing a separate vessel for that purpose.

The receptacle 10 may be of any required size or capacity and modified as to shape and manner of mounting without departing from the principle of the invention or sacrificing any of its advantages.

Having thus described the invention, what I claim is—

1. A combined butter-worker and churn comprising a barrel-like receptacle having open ends provided with detachable closures, and an angular working-roller tapering from its middle toward its ends and having handle members projecting through the open ends of said receptacle, one of said handles being detachably secured to said roller to provide for the roller and its handles being scalded in one operation with the churn.

2. A combined butter-worker and churn comprising a barrel-like receptacle having open ends provided with detachable closures, the ends being formed of annular wooden members having outturned flanges forming rims, end supporting members disposed exteriorly of said ends in the rear of said rims, said rims protecting the contents of the receptacle against contact with said end supporting members, and a working-roller having handles projecting through the open ends of said receptacle.

In testimony that I claim the foregoing as my own I have hereto affixed my signature in the presence of two witnesses.

CLARENCE J. GRIFFITH.

Witnesses:
C. F. GARDNER,
C. S. MINER.